US006311722B1

(12) United States Patent
Gounot et al.

(10) Patent No.: US 6,311,722 B1
(45) Date of Patent: Nov. 6, 2001

(54) COMPOSITE OPEN BONNET FOR LARGE INDUSTRIAL AND MEDICAL GAS CYLINDERS

(75) Inventors: Etienne Gounot; Alain Taillandier, both of Paris (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/541,028

(22) Filed: Mar. 31, 2000

(30) Foreign Application Priority Data

Apr. 1, 1999 (EP) ........................................ 99 04090

(51) Int. Cl.[7] ........................................ F16D 1/00
(52) U.S. Cl. ........................................ 137/382; 137/377
(58) Field of Search ........................................ 137/377, 382

(56) References Cited

U.S. PATENT DOCUMENTS

| | | | | |
|---|---|---|---|---|
| 2,465,095 | * | 3/1949 | Harvey | 137/382 |
| 3,552,427 | * | 1/1971 | Jacobson | 137/382 |
| 3,722,533 | * | 3/1973 | Connolly | 137/382 |
| 3,831,802 | * | 8/1974 | Chambers et al. | 220/300 |
| 4,301,828 | * | 11/1981 | Martin, Jr. | 137/381 |
| 4,332,331 | * | 6/1982 | Fawley | 220/726 |
| 4,549,568 | * | 10/1985 | Trail | 137/382 |
| 4,648,526 | * | 3/1987 | Wood, Jr. | 220/724 |
| 4,651,888 | * | 3/1987 | Wood, Jr. | 220/724 |
| 4,664,286 | * | 5/1987 | Winkelmann et al. | 220/727 |
| 4,678,003 | * | 7/1987 | Griffin | 137/382 |
| 4,880,134 | * | 11/1989 | Wood, Jr. | 220/724 |
| 4,944,424 | * | 7/1990 | Wood, Jr. | 220/724 |
| 4,967,923 | * | 11/1990 | Wren | 220/581 |
| 5,004,117 | * | 4/1991 | Kitsuda | 220/724 |
| 5,086,804 | * | 2/1992 | Ngai | 137/312 |
| 5,160,065 | * | 11/1992 | Libes et al. | 220/724 |
| 5,261,559 | * | 11/1993 | Salvucci, Sr. | 220/727 |
| 5,429,152 | * | 7/1995 | Straaten et al. | 137/377 |
| 5,566,708 | * | 10/1996 | Hobbs, Jr. | 137/360 |
| 5,927,313 | * | 7/1999 | Hart | 137/382 |
| 5,975,121 | * | 11/1999 | Arzenton et al. | 137/377 |

FOREIGN PATENT DOCUMENTS

| | | |
|---|---|---|
| 85 01 749 | 11/1986 | (DE) . |
| 196 48 440 | 3/1998 | (DE) . |
| 0 725 247 | 8/1996 | (EP) . |
| WO 91/04197 | 4/1991 | (WO) . |

* cited by examiner

*Primary Examiner*—A. Michael Chambers
*Assistant Examiner*—Thomas L. McShane
(74) *Attorney, Agent, or Firm*—Young & Thompson

(57) ABSTRACT

The invention relates to an open-type protective cowling for a fluid container, particularly for a gas cylinder, made up of a cowling body (1) made of polymer comprising an insert (2) made of metal or metal alloy with a tapping (10). As a preference, the insert (2) is essentially in the shape of a ring with a tapped internal wall and the cowling body (1) is overmolded around the tapped insert (2). In addition, the insert (2) may have one or more recesses (7) and/or one or more strengtheners (6) on its external peripheral wall. Furthermore, the invention also relates to a gas cylinder equipped with such a protective cowling, and to the method for manufacturing such a protective cowling.

28 Claims, 3 Drawing Sheets

COMPOSITE OPEN BONNET FOR LARGE INDUSTRIAL AND MEDICAL GAS CYLINDERS

The present invention relates to the field of gas containers, particularly that of gas cylinders, and more specifically the protective cowlings intended to be fitted to such gas containers.

The valves of large industrial and medical gas cylinders are conventionally protected by protective cowlings, commonly known as bonnets, of the open or closed type.

This is because it is essential for the valves of cylinders to be protected for safety reasons. In the event of dropping, while the cylinders are being transported, the bonnets must provide the valve with sufficient protection for this valve to remain operable after the cylinder has been dropped. The standard EN962 specifies the design, construction and testing relating to these bonnets.

For example, documents U.S. Pat. No. 4,521,676, WO 98/23895 and EP-A-747796 describes such protective cowlings.

Furthermore, the bonnets are used for handling the cylinders and also contribute to their marketing image.

Open bonnets present many advantages over closed bonnets. Specifically, they allow access to the gas without having to be removed, both during filling and during use of the cylinder.

They also afford the valve sufficient protection during use.

Figure 1:
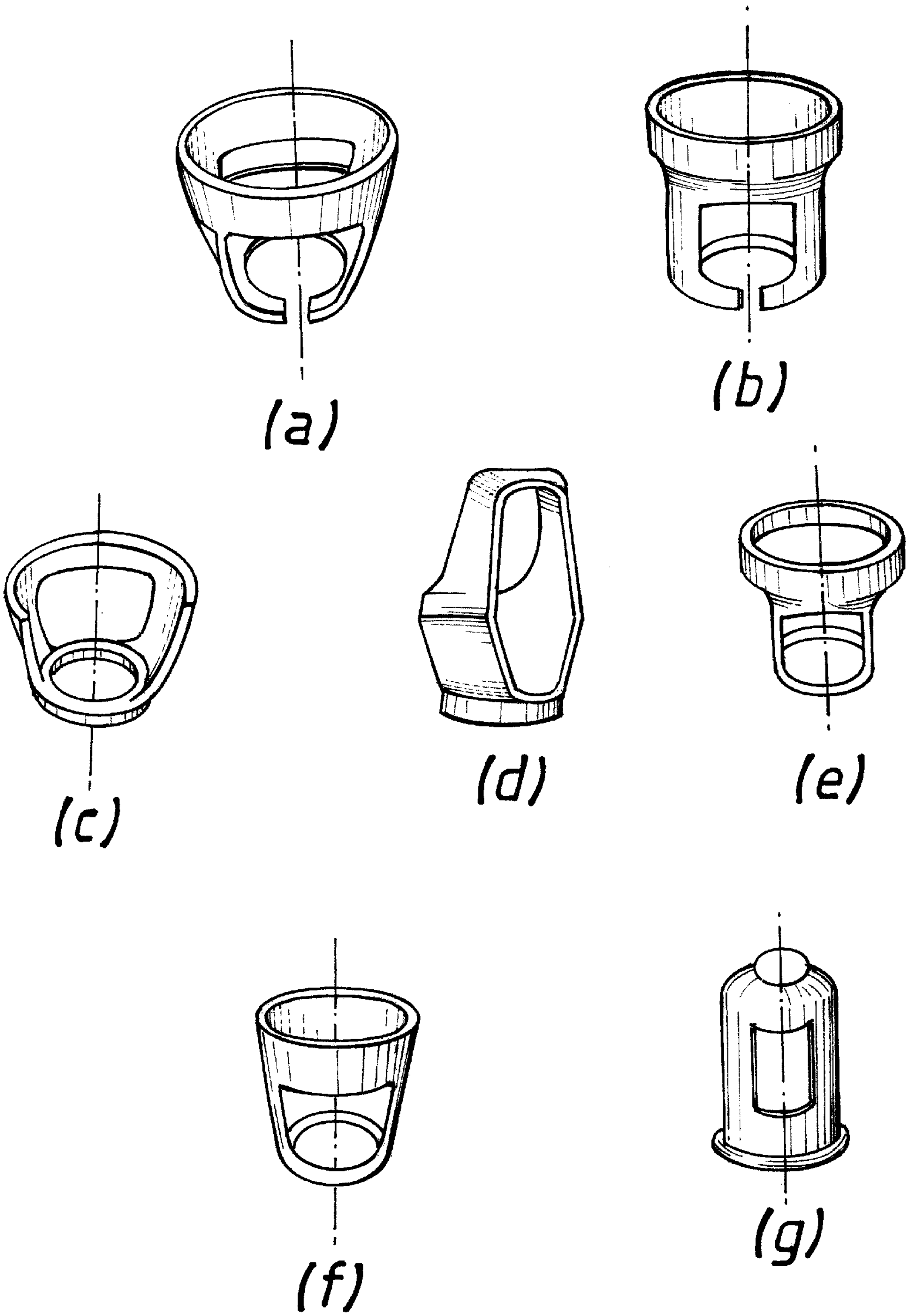

Examples of open bonnets are depicted diagrammatically in FIG. 1.

At the present time, the open bonnets of large cylinders are essentially made of metal. This is because the weight of these cylinders, from 40 to 100 kg, makes the requirements on mechanical strength of the bonnet very high.

Plastic bonnets do not offer sufficient strength, particularly in the region of the tapping by which they are attached to the flange of the cylinder.

Specifically, it has been found that in the event of impact, the plastic threads soon become damaged and the bonnet comes off.

However, plastic bonnets have the advantage of being easier to manufacture, that is to say that they can be manufactured simply by molding, and that they are also lighter than metal bonnets.

What is more, plastic bonnets have the advantage of not being sensitive to corrosion on account of their composition, something which is not the case for certain metal bonnets.

The problem which therefore arises is that of being able to have a protective bonnet for gas containers, particularly for gas cylinders, which, on the one hand, displays the advantages of plastic bonnets (ease of manufacture, absence of corrosion, etc.) and, on the other hand, those of metal bonnets (impact resistance, etc.).

In other words, the problem is that of being able to have a protective cowling which can favorably satisfy the following technical requirements:

compromise between rigidity (no slippage, no knocking of the hand wheel under the impact of being dropped) and deformation (absorption of impact energy);

stability of the properties in the ranges of service temperature and over time;

consistency, ease of mounting and attachment of the bonnet-valve assembly to the cylinder;

ergonomics in the handling and use of the cylinder, that is to say of the valve and pressure reducer located under the bonnet; and cost price equivalent to that of a metal bonnet.

The solution afforded by the present invention is a two-material bonnet made up of a metal insert overmolded in a cowling structure which is made of polymer.

The present invention therefore relates to an open protective cowling for a fluid container, particularly for a gas cylinder, made up of a cowling body made of polymer comprising an insert made of metal or metal alloy with a tapping.

As appropriate, the cowling according to the invention may have one or more of the following features:

the insert is essentially in the shape of a ring with a tapped internal wall.

the cowling body is overmolded around the tapped insert.

the insert has one or more recesses and/or one or more strengtheners on its external peripheral wall to improve the attachment of the insert to the plastic of the cowling body.

the insert comprises a material of the Zamac type.

the cowling body is made of a polymer of the polyamide type.

the cowling body is made up of a base part at least partially encompassing the insert, said base part being surmounted by a protective hoop.

the cowling body has a handling pommel, the pommel is preferably borne by the protective hoop, and the pommel preferably incorporates an electronic chip, for example an electronic chip that can be electromagnetically interrogated remotely.

According to another aspect, the invention also relates to a fluid container, particularly a gas cylinder, equipped with a valve unit or a valve/pressure reducer assembly and also bearing a protective cowling according to the invention.

In addition, the invention also relates to a method for manufacturing a protective cowling according to the invention, in which:

a) an insert, preferably tapped, is placed around a mold insert;

b) the mold is positioned around the mold insert bearing the insert, c) the constituents of the polymer material are introduced into the mold, d) the cowling is released from the mold and the mold insert is withdrawn from said cowling, after curing.

As a preference, the insert is manufactured by casting a metal alloy and subsequently tapping its internal wall.

The invention will be better understood from the appended figures, which are given by way of nonlimiting illustration.

FIG. 1 diagrammatically depicts various possible shapes of protective cowling of the open type, which are conventionally encountered in the prior art. These are usually formed of a single structure made out of metal alloy.

Figure 2:
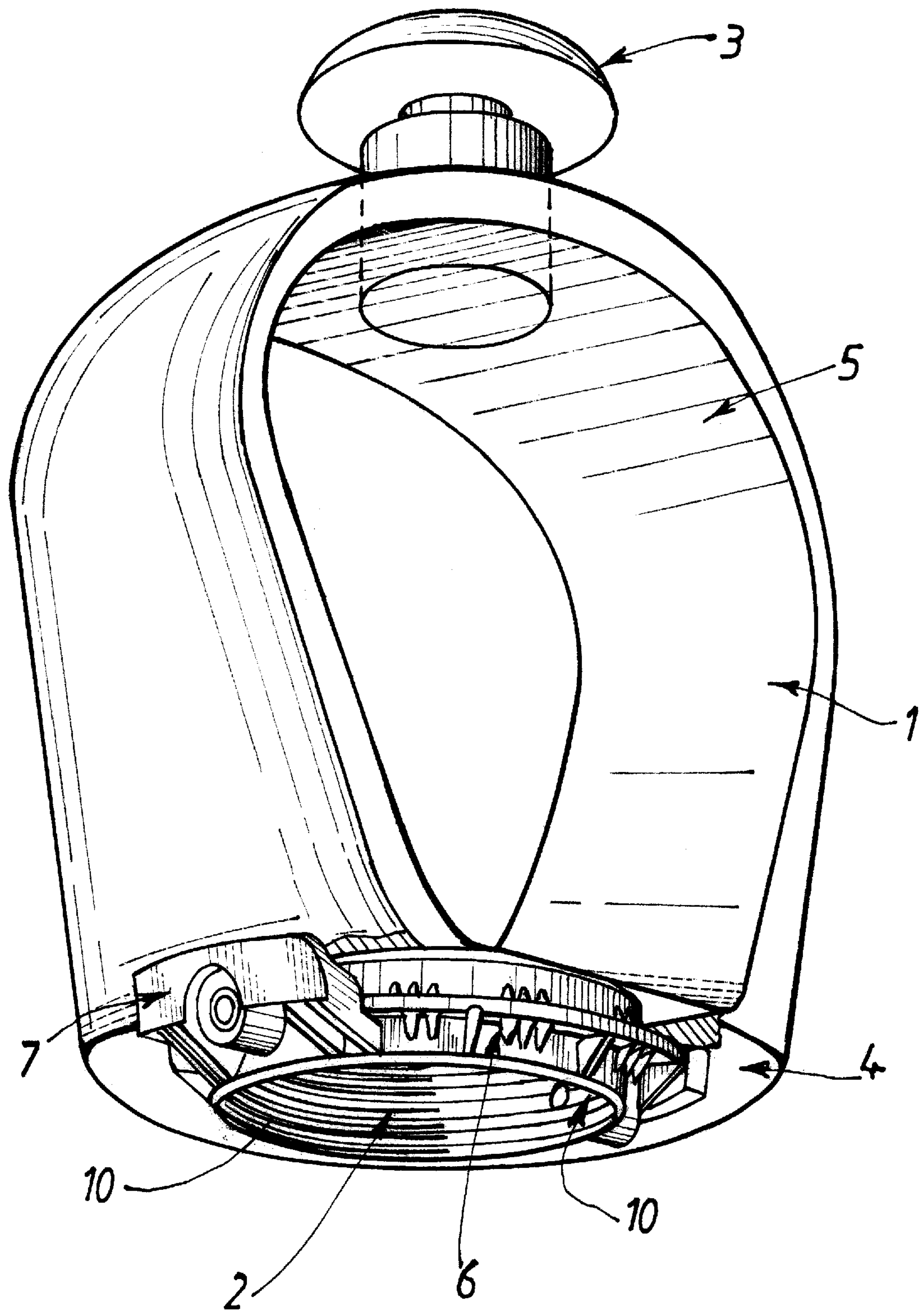
Figure 3:
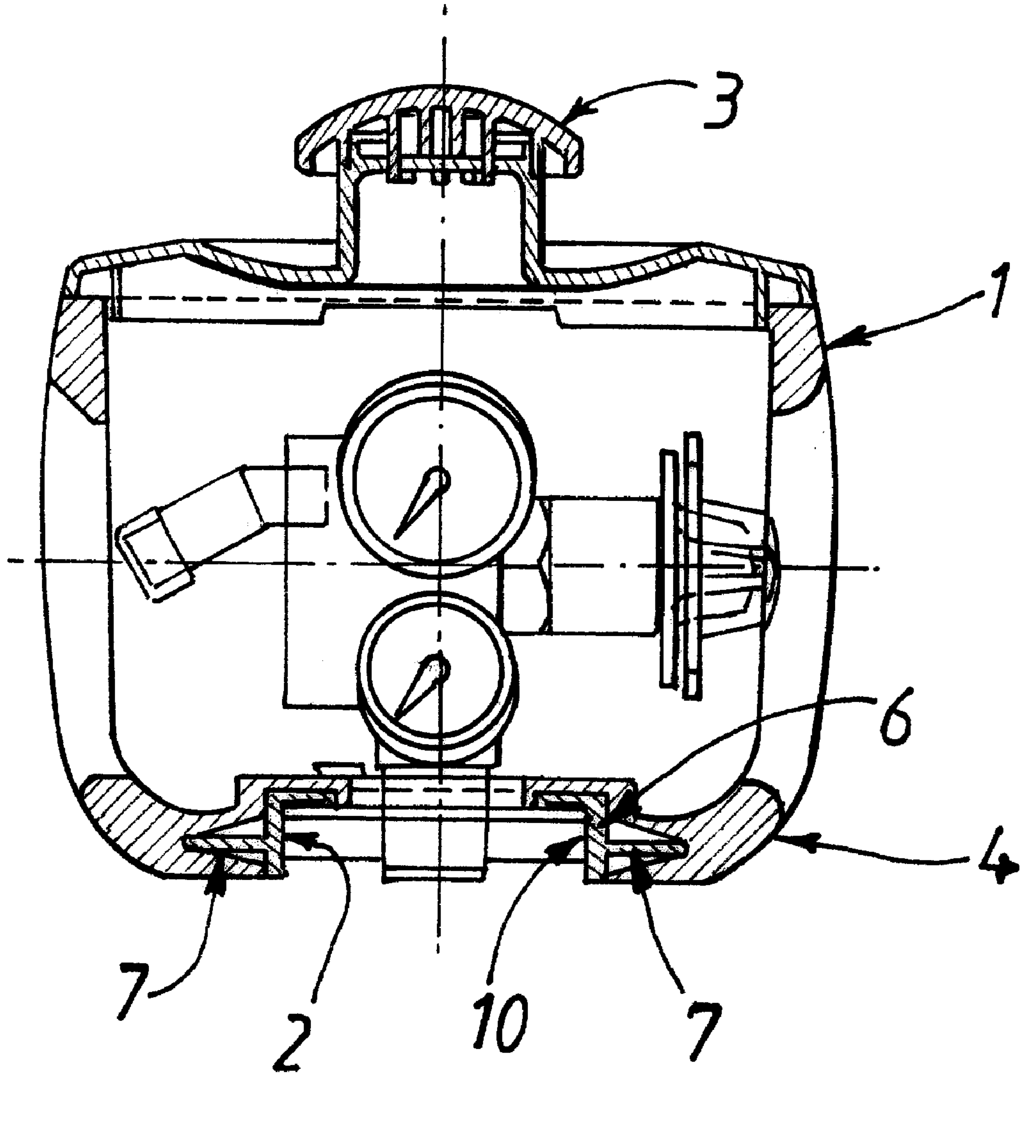

FIGS. 2 and 3, for their part, depict two embodiments of cowlings 1 according to the invention.

The cowlings of FIGS. 2 and 3 are each made up of a cowling body 1 equipped, at its base 4, with a metal insert 2.

More specifically, the insert 2 is made of a cast metal alloy, for example Zamac 5, and is intended to ensure bonding between the flange of the cylinder and the polymer shape.

The dimensions of its tapping depend on the dimensions of and tolerances on the flange of the cylinder, and on the shrinkage caused by the polymer shape as the bonnet hardens (compressing the insert).

In order to give the bottom part 4 of the bonnet some rigidity, the insert 2 has ribbed strengtheners 6. Recesses 7 also allow good bonding between the insert 2 and the plastic, and allow for good flow at the time of molding.

Screw holes 11 are provided, so that the bonnet can be efficiently attached and immobilized on the gas cylinder.

Furthermore, the polymer body 1 consists of impact-modified nylon-6, for example Grilon™.

The shape of the bonnet, combined with the properties of this polymer, solves the technical rigidity/absorption problems mentioned hereinabove.

The body is surmounted by a pommel 3 used for handling and which may contain an electronic chip (not depicted). Specifically the plastic of which the cowling is made makes the magnetic interrogation of the chip easier and more efficient than is the case with metal cowlings.

As a preference, the bonnets are manufactured as explained hereinafter.

The inserts are cast and tapped beforehand.

Next, overmolding is performed, this consisting in placing the insert on an insert bearer around the polymer-mold insert. The two mold cavities are closed, and a seal is made between the cavities, the mold insert and the insert itself.

The polymer is then injected into the mold where it is cured.

After curing, the bonnet is released from the mold and finishing operations, for example deflashing, are performed.

A protective bonnet according to the invention may be used to protect delicate parts, particularly valves, pressure reducers and/or pressure gages or gas cylinders intended for any field of activity, particularly the field of welding, electronics, agri-foodstuffs and health.

What is claimed is:

1. A protective cowling for a fluid container, particularly for a gas cylinder, made up of a cowling body made of polymer comprising an insert made of metal or metal alloy with a tapping, wherein the insert (2) has one or more recesses (7) and/or one or more strengtheners (6) on its external peripheral wall.

2. A protective cowling for a fluid container, particularly for a gas cylinder, made up of a cowling body made of polymer comprising an insert made of metal or metal alloy with a tapping, wherein the insert (2) comprises a material of the Zamac type.

3. A protective cowling for a fluid container, particularly for a gas cylinder, made up of a cowling body made of polymer comprising an insert made of metal or metal alloy with a tapping, wherein the cowling body (1) is made up of a base part (4) at least partially encompassing the insert (2), said base part (4) being surmounted by a protective hoop (5).

4. A protective cowling for a fluid container, particularly for a gas cylinder, made up of a cowling body made of polymer comprising an insert made of metal or metal alloy with a tapping, wherein the cowling body (1) has a handling pommel (3), the pommel (3) being borne by the protective hoop (5), and the pommel incorporating an electronic chip.

5. A fluid container, particularly a gas cylinder, equipped with a valve unit or a valve/pressure reducer assembly and also bearing a protective cowling having a cowling body made of polymer comprising an insert made of metal or metal alloy with a tapping.

6. A method for manufacturing a protective cowling for a fluid container, particularly for a gas cylinder, made up of a cowling body made of polymer comprising an insert made of metal or metal alloy with a tapping, in which:

a) an insert (2), preferably tapped, is placed around a mold insert;

b) the mold is positioned around the mold insert bearing the insert (2), c) the constituents of the polymer material are introduced into the mold, d) the cowling is released from the mold and the mold insert is withdrawn from said cowling, after curing.

7. The cowling as claimed in claim 1, wherein the insert (2) is essentially in the shape of a ring with a tapped internal wall.

8. The cowling as claimed in claim 1, wherein the cowling body (1) is overmolded around the tapped insert (2).

9. The cowling as claimed in claim 1, wherein the insert (2) comprises a material of the Zamac type.

10. The cowling as claimed in claim 1, wherein the cowling body is made of a polymer of the polyamide type.

11. The cowling as claimed in claim 1, wherein the cowling body (1) is made up of a base part (4) at least partially encompassing the insert (2), said base part (4) being surmounted by a protective hoop (5).

12. The cowling as claimed in claim 1, wherein the cowling body (1) has a handling pommel (3), the pommel (3) being borne by the protective hoop (5), and the pommel incorporating an electronic chip.

13. A fluid container, particularly a gas cylinder, equipped with a valve unit or a valve/pressure reducer assembly and also bearing a protective cowling as claimed in claim 1.

14. A method for manufacturing a protective cowling as claimed in claim 1 in which:

a) an insert (2), preferably tapped, is placed around a mold insert, said insert (2) having one or more recesses (7) and/or one or more strengtheners (6) on its external peripheral wall;

b) the mold is positioned around the mold insert bearing the insert (2), c) the constituents of the polymer material are introduced into the mold, d) the cowling is released from the mold and the mold insert is withdrawn from said cowling, after curing.

15. The cowling as claimed in claim 4, wherein the insert (2) is essentially in the shape of a ring with a tapped internal wall.

16. The cowling as claimed in claim 4, wherein the cowling body (1) is overmolded around the tapped insert (2).

17. The cowling as claimed in claim 4, wherein the cowling body is made of a polymer of the polyamide type.

18. The cowling as claimed in claim 4, wherein the cowling body (1) is made up of a base part (4) at least partially encompassing the insert (2), said base part (4) being surmounted by a protective hoop (5).

19. The cowling as claimed in claim 2, wherein the cowling body (1) has a handling pommel (3), the pommel (3) being borne by the protective hoop (5) and the pommel incorporating an electronic chip.

20. A fluid container, particularly a gas cylinder, equipped with a valve unit or a valve/pressure reducer assembly and also bearing a protective cowling as claimed in claim 2.

21. The cowling as claimed in claim 3, wherein the insert (2) is essentially in the shape of a ring with a tapped internal wall.

22. The cowling as claimed in claim 3, wherein the cowling body (1) is overmolded around the tapped insert (2).

23. The cowling as claimed in claim 3, wherein the cowling body (1) has a handling pommel (3), the pommel (3) being borne by the protective hoop (5) and the pommel incorporating an electronic chip.

24. A fluid container, particularly a gas cylinder, equipped with a valve unit or a valve/pressure reducer assembly and also bearing a protective cowling as claimed in claim 3.

25. The cowling as claimed in claim 4, wherein the insert (2) is essentially in the shape of a ring with a tapped internal wall.

26. The cowling as claimed in claim 4, wherein the cowling body (1) is overmolded around the tapped insert (2).

27. A fluid container, particularly a gas cylinder, equipped with a valve unit or a valve/pressure reducer assembly and also bearing a protective cowling as claimed in claim 4.

28. The cowling as claimed in claim 4, wherein the cowling body is made of a polymer of the polyamide type.

* * * * *